United States Patent [19]

Markert et al.

[11] Patent Number: 5,527,874
[45] Date of Patent: Jun. 18, 1996

[54] OXAZOLIDINONE STRUCTURES-CONTAINING PREPOLYMERIC EPOXY MIXTURE

[75] Inventors: Helmut Markert, Nuremberg; Armin Datz, Poxdorf; Peter Donner, Hemhofen; Michael Schreyer, Weisendorf, all of Germany

[73] Assignee: Siemens Aktiengesellschaft, München, Germany

[21] Appl. No.: 367,272

[22] PCT Filed: Jul. 2, 1993

[86] PCT No.: PCT/DE93/00583

§ 371 Date: Mar. 27, 1995

§ 102(e) Date: Mar. 27, 1995

[87] PCT Pub. No.: WO94/02524

PCT Pub. Date: Feb. 3, 1994

[30] Foreign Application Priority Data

Jul. 17, 1992 [DE] Germany .......................... 42 23 630.4

[51] Int. Cl.⁶ ...................................................... B29F 3/00

[52] U.S. Cl. ..................... 528/73; 525/528; 525/504; 264/177.19; 264/211.24; 264/331.12; 528/27; 523/457; 523/458

[58] Field of Search ......................... 264/211.24, 331.12, 264/177.19; 525/528, 504; 523/457, 458; 528/73, 27

[56] References Cited

U.S. PATENT DOCUMENTS 4,612,156  9/1986  Heinemeyer et al. .................... 528/99

*Primary Examiner*—Frederick Krass
*Attorney, Agent, or Firm*—Kenyon & Kenyon

[57] ABSTRACT

In a process for producing a prepolymer epoxy resin mixture with oxazolidinone structures, an insoluble reaction resin powder which has no isocyanate groups and consists of an epoxy resin mixture containing a reaction accelerator and filler and having isocyanurate structures, is fed to a continuously working reactor and reacted at temperatures up to 200° C., with reactor temperature at 140°–190° C., and then the extruded material is cooled down to a temperature of <50° C. with the aid of a cooling device mounted at the outlet die of the reactor.

17 Claims, No Drawings

OXAZOLIDINONE STRUCTURES-CONTAINING PREPOLYMERIC EPOXY MIXTURE

BACKGROUND OF THE INVENTION

1. Field of the Invention

The invention relates to a process for making an oxazolidinone structures-containing prepolymeric epoxy resin mixture and to an apparatus for carrying out said process.

2. Description of Related Art

It is known from WO 90/15089 that epoxide-terminated polyoxazolidinones (in that document referred to simply as polyoxazolidones) can be prepared by reaction of a polyepoxide and a polyisocyanate at elevated temperature in the presence of a catalyst. To this end, from 5 to 30 wt % of the polyisocyanate is added within 30 to 90 min to a mixture of 70 to 95 wt % of the polyepoxide and 0.01 to 2 wt % of the catalyst, and the resulting reaction mixture is then heated at a temperature of 110° to 200° C. for a period of 5 to 180 minutes. By regulating various process parameters, the process is carried out so that in the resulting epoxy-terminated polyoxazolidinone, which is also referred to as isocyanate-modified epoxy resin, 50 to 100% of the original isocyanate groups are converted into oxazolidinone rings and 0 to 50% into isocyanurate rings.

In the known process, the polyepoxide is, in particular, bisphenol A or tetrabromobisphenol A, and the polyisocyanate is 4,4'-methylene-bis(phenyl isocyanate) (MDI) or an isomer thereof, polymeric MDI or toluylene diisocyanate. A suitable catalyst (for the reaction of the polyepoxide and the polyisocyanate) is, in particular, an imidazole or tetraphenylphosphonium bromide. The catalyst concentration is preferably from 0.02 to 1 wt %, particularly 0.02 to 0.1 wt %, based on the total weight of the polyepoxide and the polyisocyanate. To prepare the polyoxazolidinones, the catalyst, optionally dissolved in a suitable solvent, is added to the polyepoxide, in general at a temperature below the reaction temperature of 110° to 200° C. The temperature is then raised to the reaction temperature and kept at this level while adding the polyisocyanate under controlled conditions, namely dropwise.

A similar process, known from EP 0 296 450 A1, is used for making oxazolidinone groups—(in that document referred to simply as oxazolidone groups) containing oligomeric polyepoxides from bisepoxides and diisocyanates. By this process, either a bisepoxy ether with OH groups corresponding to a hydroxyl number of at least 2 is made to react with an aromatic diisocyanate containing two NCO groups of different reactivity in an amount of at least ¼ of the weight of the diisocyanate, or a bisepoxy ester with OH groups corresponding to a hydroxyl number of at least 2 is made to react with an aromatic, aliphatic or cycloaliphatic diisocyanate in a weight ratio of NCO groups to epoxide groups of 1:1.4 to 1:2.5—both reactions being carried out in the presence of a phosphonium salt as catalyst at 140° to 180° C. The catalyst is used in an amount of 0.005 to 1.0 wt %, preferably 0.01 to 0.5 wt %, based on the bisepoxide.

In this process, it is essential that the oxazolidinone epoxy resins are obtained only when OH groups-containing epoxy resins are made to react with diisocyanates containing NCO groups of different reactivity, in the presence of a phosphonium salt as catalyst at about 160° C. To prepare the polyepoxide, the bisepoxy resin and the catalyst are heated to 160° C. under nitrogen. The diisocyanate is then added dropwise to the melt at a rate such that a temperature of about 170° C. is maintained. After all the diisocyanate has been added, the mixture is allowed to agitate at 160° C. until the calculated epoxide content has been reached and reactive NCO can no longer be detected.

Both known processes have been described only for laboratory batch sizes. It is essential in this respect that the polyisocyanate be added dropwise to the catalyst-containing polyepoxide. Hence, it is hardly possible to carry out the described processes economically on an industrial scale. Moreover, by these processes only filler-free reaction resin mixtures can be used.

SUMMARY OF THE INVENTION

The object of the invention is to provide an industrial process for making an oxazolidinone structures-containing prepolymeric epoxy resin mixture that is storage-stable, soluble or fusible, latently reactive and curable.

According to the invention, this objective is reached by feeding to a continuous reactor an isocyanate groups-free, insoluble, powdery reaction resin consisting of an isocyanurate structures-containing epoxy resin mixture containing a catalyst and a filler, causing said resin to react at a reaction temperature of up to 200° C., the reactor temperature being from 140° to 190° C., and cooling the extrudate to a temperature of <50° C. with a cooling device located at the outlet die of the reactor.

DETAILED DESCRIPTION OF THE INVENTION

A suitable continuously operating reactor for the process according to the invention is, in particular, a twin-screw extruder. Advantageously, the ratio of the screw length to the outside screw diameter of the extruder is from 20 to 50 and particularly from 25 to 40. Moreover, the extruder is preferably designed so that the residence time of the material at a screw speed of >10 rpm is less than 5 min, preferably less than 3 min. and so that axial backflow is minimized.

The insoluble, isocyanate groups-free, powdery reaction resin can be fed to the twin-screw extruder by means of a twin-screw metering device, for example at a rate of 150 g/min. The extruder contains conveying screw elements (screw diameter, for example: 31.8 mm, screw length: 880 mm) and is provided with five thermostattable barrel zones heated, for example, at 160° C. At a screw speed of 90 rpm, the residence time of the material is, for example, <1 minute. The extrudate emerging through a slot die passes over a cooled slide-off ramp and is rapidly cooled to a temperature below 50° C., which causes the epoxy resin mixture to solidify into continuous ribbon-shaped strips. On a take-off belt, these strips are pulled under a counter-roll and thus coarsely comminuted. The pre-comminuted product is ground to the desired particle size in an impact mill. The free-flowing, storage-stable, soluble or fusible, latently reactive, oxazolidinone structures-containing prepolymeric epoxy resin mixture is stored with exclusion of moisture.

The process according to the invention involves the use of an insoluble, isocyanate groups-free, powdery reaction resin. Said powdery reaction resin is prepared from a filler-containing, heat-polymerizable reaction resin mixture of polyepoxy resin and polyisocyanate resin with a molar ratio of epoxide groups to isocyanate groups of >1, preferably 1.5 to 4.0. The polyepoxy resin is a mixture of di- and polyfunctional epoxy resins, the ratio of polyfunctional to difunctional epoxy resin being from 0.1 to 1.7 and preferably from 0.2 to 0.75, based on epoxide groups. The reaction resin mixture of polyepoxide and polyisocyanate resin is made to react at a temperature of up to 180° C. in the presence of a substituted imidazole as catalyst, said imidazole being used in an amount of 0.5 to 2.5%, based on the polyepoxy resin.

Whereas according to the prior art, as indicated in particular by the practical examples of said prior art, low catalyst concentrations are used, namely from 0.01 to 0.35% (WO 90/15089) or 0.1% (EP 0 296 450 A1), in both cases based on the polyepoxide, substantially higher amounts of catalyst are needed to prepare reactive, curable prepolymeric epoxy resin mixtures. Hence, in the process according to the invention, the catalyst concentration is from 0.5 to 2.5% (by weight), preferably from 1.0 to 1.8%, based on the mixture of di- and polyfunctional epoxy resins. Such high catalyst concentrations are required to ensure the curing of the latently reactive prepolymeric epoxy resin mixture within an industrially relevant time without post-catalysis—which for filler-containing systems is expensive.

On a pilot-plant scale, the isocyanate groups-free, insoluble powdery reaction resin is advantageously prepared in a mixing vessel, preferably in a vertical kneader, a continuous reactor being used for larger amounts of material. The preparation and processing of the reaction resin mixture in a vertical kneader is carried out as follows. The di- and polyfunctional epoxy resins and the polyisocyanate resin are charged to the vertical kneader which is equipped with a thermostattable and evacuable kneading trough and with kneading blades and permits continuous measurement of the temperature of the reaction resin mixture. The mixture is heated to a temperature of up to 100° C., blended by mixing (i.e. agitation) and degassed. The filler and optionally other additives are then added in portions to the heated reaction resin mixture, and the mixture is degassed for at least 1 hr at reduced pressure and at a temperature of up to 100° C. with continuing mixing. The catalyst is then blended in, and the temperature of the mixing vessel is adjusted to 160°–180° C. The conversion of the reaction resin mixture into the powdery reaction resin occurs at reaction temperatures above 130° C. usually within a few minutes, while the steady mixing in the mixing vessel produces a free-flowing product. To discontinue the reaction, the temperature of the mixing vessel is rapidly reduced by means of a cooling thermostat, and the powdery reaction resin is brought to a temperature below 50° C. with mixing. The epoxide group conversion required at the time the reaction is discontinued is determined in preliminary tests. The absence of isocyanate groups in the powdery reaction resin is established by IR spectrophotometry. Before use, the free-flowing, storage-stable, insoluble powdery reaction resin obtained in this manner can be stored with exclusion of moisture for long periods, as needed.

When a continuous reactor is used to prepare the isocyanate groups-free, insoluble powdery reaction resin, the resin mixture can be prepared and fed to the reactor in different ways. In one case—to prepare a resin component—the di- and polyfunctional epoxy resins, the polyisocyanate resin and the filler are degassed in a thermostattable and evacuable mixing vessel at a temperature of up to 100° C. with mixing. In a second mixing vessel the catalyst component is prepared by dissolving or dispersing the catalyst in one of the resin components of the formulation or in part thereof, with degassing. The two components are then fed to a static mixing tube, and the reaction resin mixture being discharged from the mixing tube is metered into a reactor.

In another case, the resin component is prepared as in the first case. The catalyst component is prepared by vigorously blending the catalyst with part of the filler used in the formulation. The two components are then fed into a twin-screw extruder, for example by means of a peristaltic pump or a twin-screw powder metering device. In contrast to the twin-screw extruder described hereinabove, the extruder used for the preparation of the insoluble powdery reaction resin contains both conveying screw elements and kneading elements and has a greater number of thermostattable barrel zones.

The reaction of the resin component with the catalyst component to give the isocyanate groups-free, insoluble reaction resin powder is preferably carried out at a lower temperature than the reaction of the reaction resin powder to form the prepolymeric epoxy resin mixture. The storage-stable, free-flowing reaction resin powder can be metered into the continuous reactor in simple fashion without expensive metering systems. Thus, for example for product optimization, free-flowing mixtures of reaction resin powders of different composition or mixtures with fillers and/or other additives can be introduced into and processed in the continuous reactor inexpensively.

To prepare the insoluble powdery reaction resin, a polyepoxy resin mixture, namely a mixture of di- and polyfunctional epoxy resins is used, as previously indicated. Suitable epoxy resins are, in particular, bisphenol A and bisphenol F epoxy resins and phenol novolak and cresol novolak epoxy resins or silicone epoxy resins, triglycidyl isocyanurate, tetra-glycidyldiaminodiphenylmethane and polyglycidylphosphorus resins. Particularly suitable silicone epoxy resins are those having the following structure:

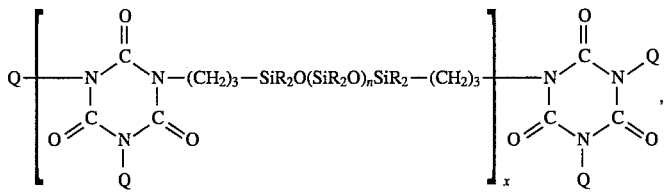

wherein n is an integer from 0 to 25, x is an integer from 0 to 3,

R=alkyl or aryl,

Q=—$(CH_2)_3SiR_2O(SiR_2O)_nSiR_2R^1$, n and R having the afore-indicated meaning and $R^1$ denoting a group bearing epoxy functionality and having 6 carbon atoms.

The silicone epoxy resin is used in an amount of up to 20%, preferably 1 to 7%, based on the filler-free reaction resin mixture of polyepoxy resin and polyisocyanate resin.

Preferred polyisocyanate resins are isomer mixtures of diphenylmethane diisocyanate. Also suitable are, for example, toluylene diisocyanate isomer mixtures and prepolymers of diphenylmethane diisocyanate isomer mixtures. Mixtures of said polyisocyanate resins can also be used.

Substituted imidazoles are used as catalysts (i.e. reaction accelerators) for the process of the invention. Preferred are 2-ethyl-4-methylimidazole, 2-phenylimidazole and 1-cyanoethyl-2-phenylimidazole. Other suitable catalysts are, for example, 1,2-dimethylimidazole, 1-cyanoethyl-2-methylimidazole, 2-isopropylimidazole and 1-benzyl-2-phenylimidazole. The catalyst is used in amount of 0.5 to 2.5%, preferably 1.0 to 1.8%, based on the polyepoxy resin, namely on the mixture of the di- and polyfunctional epoxy resins.

Suitable fillers are, in particular, mineral fillers, such as fused quartz with angular (i.e. splintery) and/or spherical particles (of varying particle size distribution). Moreover, ceramic fillers such as aluminum oxide and mixtures of ceramic and mineral fillers can be used. Fibrous fillers, such as short glass fibers, are also suitable.

The composition of the reaction resin mixture of polyepoxy resin and polyisocyanate resin used in the process according to the invention differs markedly from that of the reaction mixtures used according to the prior art. In fact, to prepare the reaction resin mixture, mixtures of di- and polyfunctional epoxy resins are used, namely mixtures of epoxy resins of different chemical structure and different functionality. Such mixtures, however, are not known from the prior art. Moreover, neither the particularly well suited catalyst 1-cyanoethyl-2-phenylimidazole nor the silicone epoxy resins of the indicated type which are important for the processing properties nor the tetraglycidyldiaminodiphenylmethane, which is particularly advantageous for raising the glass transition temperature, are mentioned in the prior art.

The preparation of free-flowing, storage stable, isocyanate groups-free, isocyanurate structures-containing powdery reaction resins obtained from a mixture of a di- and a polyfunctional epoxy resin and a polyisocyanate resin in a molar ratio of epoxide groups to isocyanate groups of >1 by use of a substituted imidazole as catalyst has thus far not been described. What is known is the preparation of filler and catalyst-containing resin mixtures from epoxy and isocyanate resins that are solid at room temperature by use of an imidazole. In this case, the components are mixed by kneading at 80° C. (see: JP-OS [Japanese unexamined patent application] 50-059499 and JP-OS 51-128400). These catalyst-containing resin mixtures are molded and cured at a temperature of up 180° C. Such processes, in contrast to the process according to the invention, do not give isocyanate groups-free, insoluble powdery reaction resins, but, rather, fusible resin mixtures that are processed by molding.

Those skilled in the art could not have predicted the possibility of preparing a soluble or fusible prepolymeric epoxy resin mixture from the insoluble, isocyanate groups-free (chemically crosslinked) powdery reaction resins by reaction extrusion according to the process of the invention. Surprisingly, the polyfunctional epoxy resins such as said silicone epoxy resins and tetraglycidyldiaminodiphenylmethane contained in the powdery reaction resin and the use of a high catalyst concentration at a temperature of up to 200° C. do not cause further curing of the powdery reaction resin, but result in a storage-stable, soluble or fusible, curable epoxy resin mixture which can be cured without post-catalysis, which for filler-containing reaction resins would be expensive.

The invention will be illustrated in greater detail by the following examples.

EXAMPLE 1

Preparation of an Isocyanate Groups-free Insoluble Powdery Reaction Resin

To a vertical kneader were charged 1530 g of bisphenol A epoxy resin (epoxide content: 5.78 mol/kg), 99 g of a silicone epoxide (epoxy content: 1.9 mol/kg) prepared as described in Example 9 of European Unexamined Patent Application EP-OS 0 399 199, 495 g of tetraglycidyldiaminodiphenylmethane (epoxide content: 8.2 mol/kg) and 360 g of a diphenylmethane diisocyanate isomer mixture (isocyanate content: 7.9 mol/kg), and the mixture was heated to 80° C. with mixing. To this mixture were then added in portions and with mixing 4347 g of spherical fused quartz, 1863 g of angular fused quartz and 90 g of carbon black. The mixture was degassed at 80° C. for 1 hr with mixing. Then 3.3 g of 1-cyanoethyl-2-phenylimidazole was added to the reaction resin mixture, and the mixture was degassed for 10 min with mixing. The temperature of the mixing vessel was then adjusted to 160° C., and the reaction resin mixture was heated with mixing. The reaction resulting in the powdery reaction resin started at about 130° C. The course of the reaction was followed continuously by temperature measurement. The reaction was discontinued 1 min after the reaction resin mixture had solidified. This was done by cooling the mixing vessel with the aid of a cooling thermostat. The temperature of the reaction resin was then reduced to below 50° C. with continuing mixing. Continuing mixing produced the insoluble reaction resin as a free-flowing, storage-stable powder (epoxide content: 1.28 mol/kg). As indicated by IR spectrophotometry, this product was devoid of isocyanate groups.

EXAMPLE 2

Preparation of an Oxazolidinone Structures-containing Prepolymeric Epoxy Resin Mixture By means of a powder-metering device, the isocyanate groups-free, insoluble powdery reaction resin prepared as described in Example 1 was fed to a co-currently rotating twin-screw extruder (screw length: 880 mm, outside screw diameter: 31.8 mm) at a constant rate of 30 g/minute. The extruder screws were provided exclusively with conveying elements. The five barrel zones of the extruder were set at 160° C. The temperatures in the individual barrel zones were as follows: zone 1: 152° C., zone 2: 158° C., zone 3: 160° C., zone 4: 160° C., zone 5: 155° C. The screw speed was 90 rpm and the residence time of the material in the extruder was 1.0 minute. The extrudate was removed through a double slot die (cross-section: 2 mm×2 mm each), cooled to a temperature below 50° C. by means of a cooled take-off ramp and then coarsely comminuted on an attached elastic haul-off belt by means of a counter-roll. The pre-comminuted extrudate was ground to the desired particle size in an impact mill. The resulting free-flowing, latently reactive, curable prepolymeric epoxy resin mixture (epoxide content: 0.86 mol/kg; melting range: 75°–95° C.) was stored at room temperature with exclusion of moisture.

EXAMPLE 3

Preparation of an Isocyanate Groups-free Insoluble Powdery Reaction Resin

To a vertical kneader were charged 825.2 g of bisphenol A epoxy resin (epoxide content: 5.78 mol/kg), 50.1 g of a silicone epoxide (epoxy content: 1.9 mol/kg) prepared as described in Example 9 of EP-OS 0 399 199, 262.1 g of tetraglycidyldiaminodiphenylmethane (epoxide content: 8.2 mol/kg) and 286.4 g of a diphenylmethane diisocyanate isomer mixture (isocyanate content: 7.9 mol/kg), and the mixture was heated to 85° C. with mixing. To this mixture was added in portions 7560 g of aluminum oxide (particle size<150 μm) and the mixture was degassed 1 hr at 85° C. To the reaction resin mixture was added 16.2 g of 2-phenylimidazole, and the mixture was degassed 10 min with mixing. The reaction resin mixture was then worked up as in Example 1. This gave an isocyanate groups-free, insoluble reaction resin in the form of a free-flowing powder (epoxide content: 0.7 mol/kg).

EXAMPLE 4

Preparation of an Oxazolidinone Structures-containing Prepolymeric Epoxy Resin Mixture By means of a powder-metering device, the isocyanate groups-free, insoluble powdery reaction resin prepared as described in Example 3 was added to a twin-screw extruder described in Example 2 at a constant rate of 60 g/minute. The five barrel zones of the extruder were set at 165° C. The temperatures in the individual barrel zones were as follows: zone 1: 155° C., zone 2: 162° C., zone 3: 165° C., zone 4: 165° C., zone 5: 159° C. The screw speed was 95 rpm and the residence time of the material in the extruder was 0.9 minute. Work-up as in Example 2 gave a free-flowing, latently reactive, curable prepolymeric epoxy resin mixture (epoxide content: 0.49 mol/kg; melting range: 75°–95° C.) which was stored at room temperature with exclusion of moisture.

EXAMPLE 5

Preparation of an Isocyanate Groups-free, Insoluble, Powdery Reaction Resin

To prepare a resin component, 2550 g of bisphenol A epoxy resin (epoxide content: 5.78 mol/kg), 155 g of a silicone epoxide (epoxide content: 1.9 mol/kg) prepared as described in Example 9 of EP-OS 0 399 199, 810 g of tetraglycidyldiaminodiphenylmethane (epoxide content: 8.2 mol/kg) and 885 g of an isomer mixture of diphenylmethane diisocyanate (isocyanate content: 7.9 mol/kg) were charged to a thermostattable and evacuable mixing vessel (effective capacity: 20 l) and the mixture was heated to 60° C. with mixing. To this mixture were added in portions 6195 g of spherical fused silica, 2655 g of angular fused silica and 135 g of carbon black, and the mixture was degassed 1 hr at 60° C. with mixing. To prepare a catalyst component, 1050 g of spherical fused silica, 450 g of angular fused silica, 15 g of carbon black and 55.5 g of 1-cyanoethyl-2-phenylimidazole were uniformly mixed. The resin component was added to a twin-screw extruder by means of a peristaltic pump at a steady rate of 42 g/min, and the catalyst component was added to a twin-screw extruder by means of a twin-screw metering device at a constant rate of 5 g/minute The twin-screw extruder was extended by a mixing section located ahead of the processing section and by a discharge section downstream of the processing section. The extrudate was removed from the extruder without using an extrusion die. The screw length was 1232 mm and the outside screw diameter was 31.8 mm. The screws of the extruder were built as follows. The feeding zone contained conveying screw elements, the adjacent mixing zone contained kneading elements, the processing zone contained conveying screw elements and the end of the screw was once again provided with kneading elements for the purpose of comminuting the extrudate to a uniform particle size and to remove it from the open extruder. The seven barrel zones of the extruder were set at the following temperatures: zone 1 (blending zone): 62° C., zone 2: 110° C., zones 3 to 7: 150° C. The screw speed was 80 rpm and the residence time of the material in the twin-screw extruder was 1.3 minutes. The extrudate was cooled to 40° C. by means of a cooled take-off ramp. The resulting isocyanate groups-free, insoluble, powdery reaction resin (epoxide content: 1.38 mol/kg) was stored at room temperature.

EXAMPLE 6

Preparation of an Oxazolidinone Groups-containing Prepolymeric Epoxy Resin Mixture By means of a powder-metering device, the isocyanate groups-free, insoluble, powdery reaction resin prepared in Example 5 was fed to a twin-screw extruder described in Example 2 at a constant rate of 150 g/minute. The five barrel zones of the extruder were set at 170° C. The temperatures in the individual barrel zones were as follows: zone 1: 162° C., zone 2: 166° C., zone 3: 170° C., zone 4: 170° C., zone 5: 163° C. The screw speed was 100 rpm and the residence time of the material in the extruder was 0.8 minute. Work-up as in Example 2 gave a free-flowing, latently reactive, curable prepolymeric epoxy resin mixture (epoxide content: 0.84 mol/kg; melting range: 75°–95° C.) which was stored at room temperature with exclusion of moisture.

We claim:

1. A process for continuously producing an oxazolidinone-containing epoxy resin prepolymer mixture, comprising the steps of: feeding an isocyanate group-free, powdery reaction resin comprising an isocyanurate-containing epoxy resin prepolymer mixture containing an inertly substituted imidazole as a catalyst, in an amount of 0.5 to 2.5% by weight based on the epoxy resin, and containing a filler, to a continuously working reactor; reacting the resin at a reaction temperature of up to 200° C., the reactor temperature being from 140° to 190° C.; and continuously cooling extrudate emerging from an outlet die of the reactor to a temperature of <50° C. by means of a cooling device located at the outlet die of the reactor.

2. The process according to claim 1 wherein the powdery reaction resin is prepared from a thermally-polymerizable filler-containing reaction resin mixture of a polyepoxy resin comprising a mixture of di- and polyfunctional epoxy resins and a polyisocyanate and having a molar ratio of epoxide groups to isocyanate groups of >1 at a temperature of up to 180° C. by using the inertly substituted imidazole catalyst.

3. The process according to claim 2 wherein the powdery reaction resin is prepared in a kneader or in a continuous reactor.

4. The process according to claim 1 wherein the epoxy resin is selected from the group consisting of a bisphenol A epoxy resin, a bisphenol F epoxy resin, a phenol novolak epoxy resin, a cresol novolak epoxy resin, a silicone epoxy resin, triglycidyl isocyanurate, tetraglycidyldiaminodiphenylmethane and a polyglycidylphosphorus resin.

5. The process according to claim 2 wherein the epoxy resin is selected from the group consisting of a bisphenol A epoxy resin, a bisphenol F epoxy resin, a phenol novolak epoxy resin, a cresol novolak epoxy resin, a silicone epoxy resin, triglycidyl isocyanurate, tetraglycidyldiaminodiphenylmethane and a polyglycidylphosphorus resin.

6. The process according to claim 3 wherein the epoxy resin is selected from the group consisting of a bisphenol A epoxy resin, a bisphenol F epoxy resin, a phenol novolak epoxy resin, a cresol novolak epoxy resin, a silicone epoxy resin, triglycidyl isocyanurate, tetraglycidyldiaminodiphenylmethane and a polyglycidylphosphorus resin.

7. The process according to claim 2 wherein in the epoxy resin mixture the molar ratio of polyfunctional to difunctional epoxy resin is 0.2 to 0.75, based on the epoxide groups.

8. The process according to claim 5 wherein in the epoxy resin mixture the molar ratio of polyfunctional to difunctional epoxy resin is 0.2 to 0.75, based on the epoxide groups.

9. The process according to claim 2 wherein the polyisocyanate is an isomer mixture of diphenylmethane diisocyanate or of toluylene diisocyanate or a prepolymer of a diphenylmethane diisocyanate isomer mixture.

10. The process according to claim 1 wherein the catalyst is 2-ethyl-4-methylimidazole, 2-phenylimidazole or 1-cyanoethyl-2-phenylimidazole.

11. The process according to claim 2 wherein the catalyst is 2-ethyl-4-methylimidazole, 2-phenylimidazole or 1-cyanoethyl-2-phenylimidazole.

12. The process according to claim 4 wherein the catalyst is 2-ethyl-4-methylimidazole, 2-phenylimidazole or 1-cyanoethyl-2-phenylimidazole.

13. The process according to claim 9 wherein the catalyst is 2-ethyl-4-methylimidazole, 2-phenylimidazole or 1-cyanoethyl-2-phenylimidazole.

14. The process according to claim 1 wherein the filler is a mineral filler or a ceramic filler.

15. The process according to claim 14 wherein the filler is fused silica or aluminum oxide.

16. The process according to claim 1 wherein a twin-screw extruder is used as the continuous reactor, wherein the ratio of screw length to outside screw diameter is from 20 to 50.

17. The process according to claim 16 wherein the reactor includes shafts consisting of conveying screw elements or of conveying screw elements and kneading elements, and wherein the residence time of the material being extruded at a screw speed of >10 rpm and with minimum axial backflow, is <5 minutes.

* * * * *